United States Patent [19]

Mower et al.

[11] 4,278,161
[45] Jul. 14, 1981

[54] COUPLING ARRANGEMENT FOR AN ELECTROMAGNETIC CLUTCH

[75] Inventors: Michael L. Mower, Elmira; William A. Carleton, Pine City, both of N.Y.

[73] Assignee: Facet Enterprises, Inc., Tulsa, Okla.

[21] Appl. No.: 945,274

[22] Filed: Sep. 25, 1978

[51] Int. Cl.³ .................. F16D 27/10; F16D 3/60
[52] U.S. Cl. ............................ 192/84 C; 64/12; 64/23; 192/106.1
[58] Field of Search ............... 192/84 C, 84 B, 106.1, 192/89 B; 64/12, 23; 267/158; 248/603, 604

[56] References Cited

U.S. PATENT DOCUMENTS

| | | | |
|---|---|---|---|
| 1,601,223 | 9/1926 | Naugler | 64/12 |
| 1,925,956 | 9/1933 | Easter | 192/84 B |
| 2,407,757 | 9/1946 | MacCallum | 192/84 C |
| 2,561,117 | 7/1951 | Hoffer | 64/12 |
| 2,580,781 | 1/1952 | Hoffer | 64/12 |
| 3,082,933 | 3/1963 | Bernard | 192/84 C X |
| 3,565,223 | 2/1971 | Pierce | 192/106.1 X |
| 3,760,917 | 9/1973 | Pagdin | 192/84 C |
| 4,119,184 | 10/1978 | Mower et al. | 192/84 C X |

FOREIGN PATENT DOCUMENTS

| | | | |
|---|---|---|---|
| 2510678 | 9/1976 | Fed. Rep. of Germany | 64/12 |
| 2373719 | 7/1978 | France | 192/84 C |
| 533543 | 10/1940 | United Kingdom | 248/603 |

*Primary Examiner*—Rodney H. Bonck
*Attorney, Agent, or Firm*—Remy J. VanOphem

[57] ABSTRACT

A coupling arrangement is disclosed for establishing a rotary connection between an axially movable armature element and a rotary drive hub, which transmits torque from the hub into the armature while allowing limited axial movement of the armature against an axial spring force exerted by the coupling arrangement. The coupling arrangement includes a series of circumferentially extending leaf springs, each having one end pinned to the armature and the other riveted to the hub. The circumferential pattern of the spring links is such that each link overlies other spring links in the series to enable the length of the spring link to be great enough to insure adequate flexibility of the links to accommodate axial movement of the armature, while enabling a sufficient number of the spring links to be disposed about the armature and hub axis to adequately transmit the torque through the clutch unit.

6 Claims, 3 Drawing Figures

COUPLING ARRANGEMENT FOR AN ELECTROMAGNETIC CLUTCH

BACKGROUND OF THE INVENTION

In the design of many electromagnetic clutch assemblies, there is often included an armature member which is axially movable into and out of engagement with an inner body, which engagement establishes drive through the clutch. The axial position of the armature is controlled by an electromagnetic coil which draws the armature into engagement with the inner body. This axial movement is generally against the disengaging bias of a biasing spring. The armature, at the same time, transmits torque through the unit and, thus, must be rotatably connected to either the driven or driving hub members. These requirements for the mounting of the armature, i.e., that the armature be spring biased out of engagement with the inner body and, at the same time, be rotatably connected to a driving or driven hub while being mounted for relative axial movement, is often provided by a simple splined engagement with the hub member with a bias spring urging the armature out of engagement with the inner body.

An arrangement disclosed in application Ser. No. 793,710, filed May 4, 1977 U.S. Pat. No. 4,119,184, issued Oct. 10, 1978 provides these requirements while generating an augmenting engagement force. In this arrangement, circumferentially spaced leaf springs are provided having opposite ends connected respectively to the hub and the armature. This patent application discloses a three leaf spring arrangement. It is difficult to increase the torque capacity of the unit by merely up-sizing the leaf spring elements and the riveted connections utilized to secure the same to the hub and armature, respectively, since the increased sizing would tend to interfere with the pole areas. The springs, being constructed of steel, could potentially cause some leakage of the magnetic flux into the hub member, reducing the electromagnetic flux transmitted by the armature, thus reducing the clutch pull-in force.

Increasing the number of leaf springs, i.e., from three to six in an attempt to provide adequate torque capacity, has led to further difficulties in that the shortened length of the leaf springs produces an increased stiffness of the spring elements, tending to create an excessive resisting force to movement of the armature. Upon wear of the unit such that the air gap existing between the armature and the inner body is increased, the excessively high bias forces exerted by the leaf springs could prevent proper engagement of the clutch resulting in premature failure of the unit.

The thickness of the leaf springs can only be reduced to a limited degree before the torque capacity of the coupling arrangement is compromised.

Accordingly, it is the object of the present invention to provide a coupling arrangement for an electromagnetic clutch of the general type described, i.e., in which a plurality of circumferentially extending leaf spring elements are employed to produce a torsional connection while accommodating limited axial movement and exerting an axial bias force on the connected element, in which a relatively large number of leaf spring elements are incorporated in the coupling arrangement without unduly increasing the stiffness of the leaf spring elements.

SUMMARY OF THE INVENTION

This and other objects of the invention, which will become apparent upon a reading of the following specification and claims are achieved by an arrangement wherein the leaf spring elements are arranged in a crossing pattern in which each leaf spring element passes over the ends of adjacent leaf spring elements such that the length of each leaf spring element can be substantially increased. Thus, for a given thickness, the torsional capacity of the coupling arrangement is not reduced while the axial compliance of the coupling arrangement is adequate for proper clutch operation. A spacer element is employed at one end of each connection of the leaf spring, creating a clearance space beneath which the adjacent crossing leaf spring can pass without contact. The crossing pattern positions each leaf spring element crossing through the clearance space of one adjacent leaf spring, while passing over the more remote adjacent leaf spring with the direction being such as to eliminate any interference during the axial deflection of each leaf spring element.

DETAILED DESCRIPTION

Figure 1:
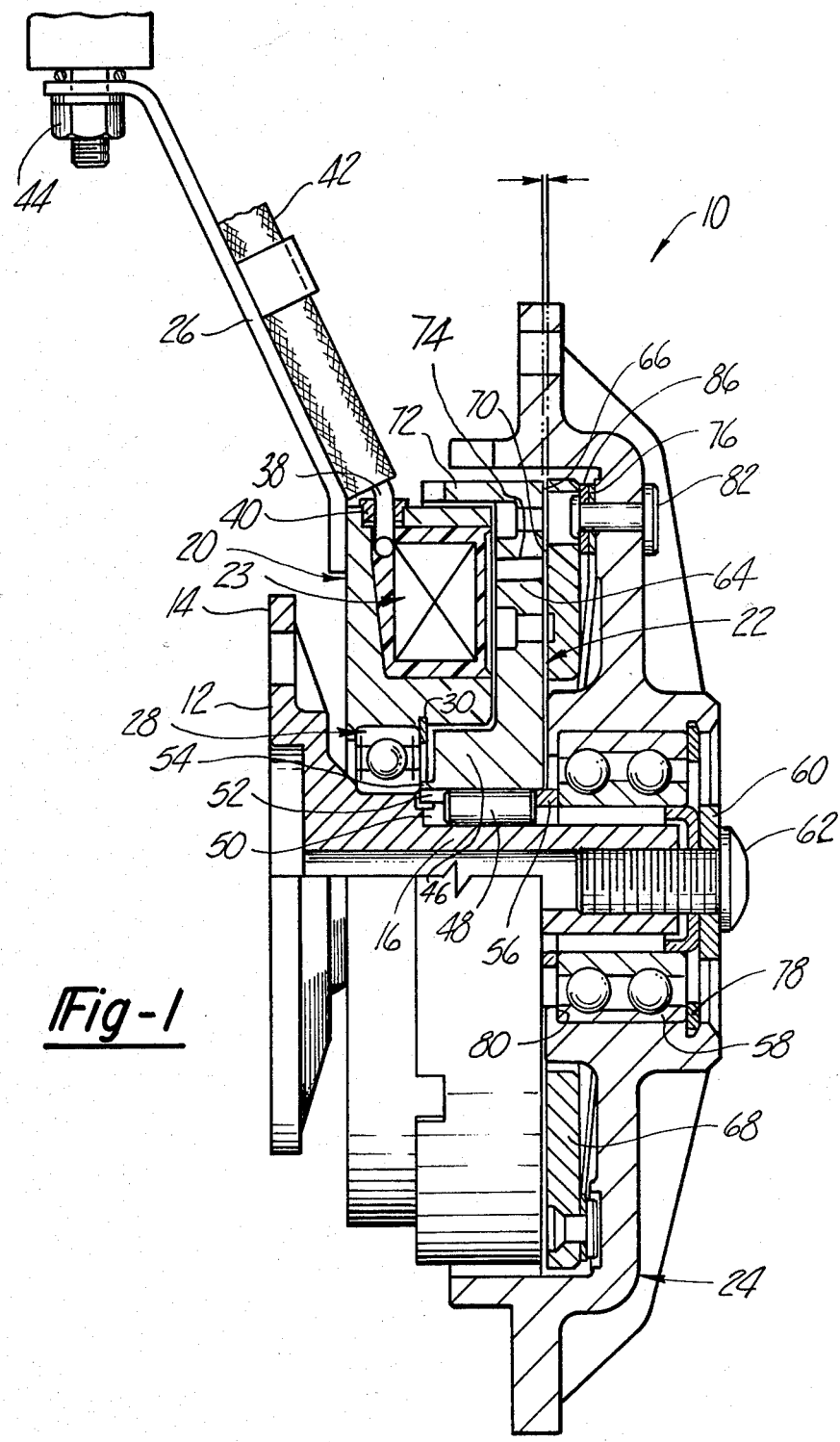
FIG. 1 is a side elevational view of an electromagnetically operated clutch incorporating a coupling arrangement according to the present invention, shown in partial section.

In the following specification and claims, certain specific language will be utilized, a specific embodiment described in accordance with the requirements of 35 U.S.C. 112, but it is to be understood that the same is not intended to be limiting and should not be so construed inasmuch as the invention is capable of taking many forms and variations within the scope of the appended claims.

In the following detailed description, the coupling arrangement will be described in conjunction with an improved electromagnetic clutch, but it is to be understood that the coupling arrangement may also be utilized in differing environments in which the combined requirements of limited relative axial movement, together with a torsional interconnection between rotatably mounted elements is required.

Referring to the drawings, a fan drive assembly 10 is depicted in which the electromagnetic clutch is integrated, which includes a central drive shaft 12 having a flange portion 14 adapted to be mounted to the fan drive hub (not shown). The central drive shaft 12 also includes an extension 16 on which are rotatably mounted a field coil housing 20, and axially adjacent an inner body 22, and a fan blade mounting hub 24.

The field coil housing 20 is restrained against rotation relative to the rest of the assembly by an annular rotation arm 26 secured thereto, with the remainder of the assembly rotatably mounted on the field coil housing 20 by means of an anti-friction bearing 28 retained by a snap ring 30 in a bore formed on the interior of the field coil housing 20.

The field coil 23 is mounted within the field coil housing 20, with the coil leads 38 extending through a grommet 40, to a terminal block 42, mounted to the anti-rotation arm 26. The anti-rotation arm 26 is secured to a stationary structure by means of a nut and bolt assembly 44.

The inner body 22 includes an inner hub 46 rotationally fixed to the central drive shaft 12 by a key 48 disposed in the keyway 50 formed in the central shaft 12, as well as a keyway 52 formed in the inside diameter of the inner hub 46. The lip 54 of inner hub 46 abuts the anti-friction bearing 28 inner race serving to maintain its axial position. The inner body 22 is axially located at its other end by means of a spacer 56 abuting a second anti-friction bearing 58 mounted on the outside diameter of the hub extension 16 and secured thereon by means of a retainer 60 and, in turn, secured by means of a hex socket screw 62 threaded into the interior of the hub extension 16.

The inner body 22 also includes a radially extending portion 64 having a radial face 66 disposed opposite a ferromagnetic armature 68 having a corresponding radial face 70 disposed with a slight air gap therebetween, as indicated.

The inner body 22 also has an outer skirt portion 72 extending over the electromagnetic coil 23 to provide a magnetic flux path extending through the skirt portion 72 into the armature 68 and thence back into the radially inner portion of the inner body 22 to return to the electromagnetic coil 23, in a generally toroidal path.

Figure 2:
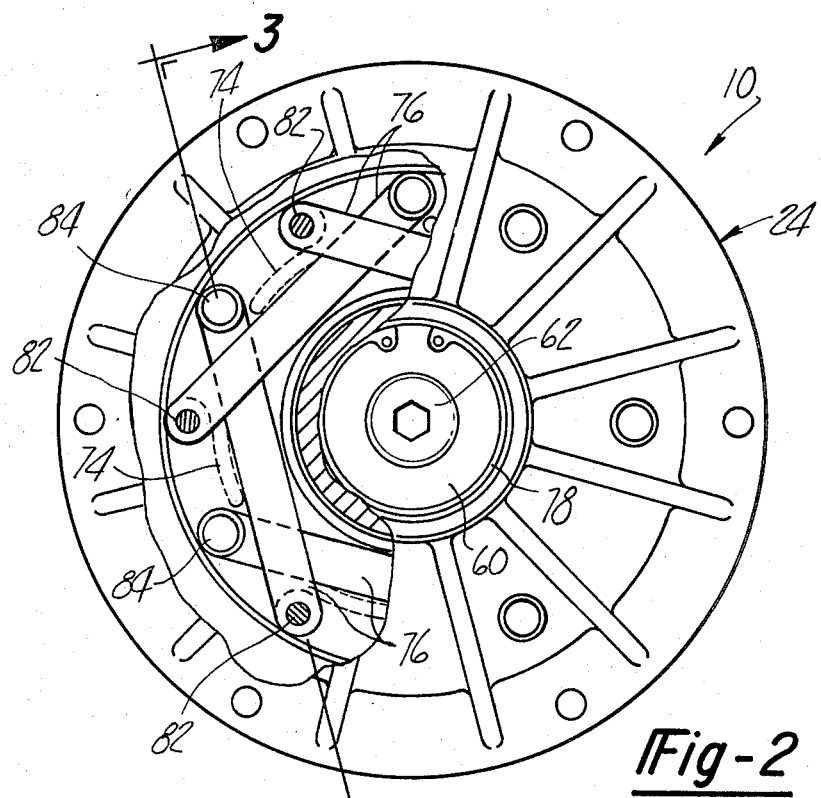
FIG. 2 is an end view of the hub assembly incorporated in the electromagnetic clutch depicted in FIG. 1, to which is mounted the coupling arrangement according to the present invention.

Circumferentially extending kidney-shaped slots 74, FIG. 2, are provided about the inner body 22 radially extending portion 64 in order to increase the flux density in the armature in a manner well known in the art.

The annularly shaped armature 68 is connected to the fan hub 24 by a series of six elongated flat leaf spring elements 76, which extend circumferentially about the clutch axis.

One end of each leaf spring element 76 is secured to the armature and, at the other, to the axially fixed fan hub 24.

The fan hub 24 is axially fixed with respect to the drive hub 12 by virtue of a snap ring retainer 78 abutting the anti-friction bearing 58 which, in turn, is abutted against the shoulder 80 formed in the interior bore machined in the fan hub 24.

Thus, the leaf spring elements 76 are, in effect, fixed to an axially fixed member comprised of the fan hub 24 at one end, and joined at the other end to a limitedly axially movable element consisting of the armature 68.

The affixation is by means of rivets 82 securing the one end of each leaf spring element 76 to the fan hub 24, and rivets 84 (shown in FIG. 3) affixing the opposite end to the armature 68. The leaf springs 76 are connected in an alternate pattern, i.e., connected successively to the hub 24 and to the armature 68 about the clutch axis.

Figure 3:
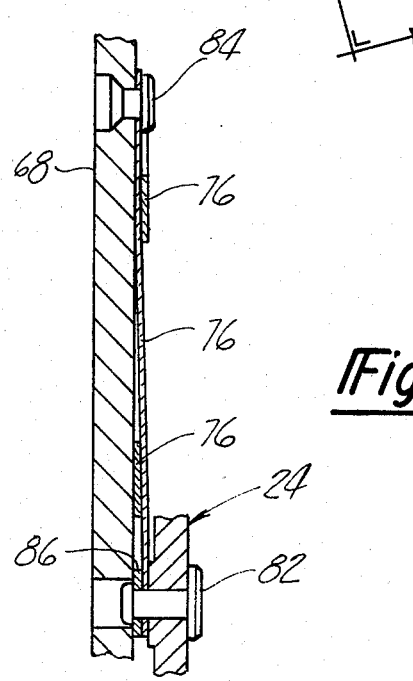
FIG. 3 is a view of the section 3—3 depicted in FIG. 2.

The specific pattern of the leaf spring elements 76 forms the coupling arrangement according to the present invention as can best be seen in FIGS. 2 and 3. Each leaf spring element 76 extends across the next adjacent pair of leaf spring elements 76 at a point next to their respective fixed ends.

However, the crossing pattern is such that each leaf spring element 76 passes over the next adjacent leaf spring element at the point where it is joined by the rivet 84 to the armature 68. The opposite is true of its relationship with the more remote leaf spring element 76 (connected to the fan hub 24) over which is crosses. That is, the spring element passes beneath the more remote leaf spring element 76 adjacent the point where it is secured to the axially fixed fan hub member 24.

This relationship is best seen in FIG. 3.

The end of the end of each leaf spring element 76 which is secured to the fan hub 24 is caused to be axially spaced from its opposite armature secured end by means of a spacer 86 positioned beneath the rivet 82. This, thus, provides a clearance space beneath which the crossing leaf spring element 76 may pass without touching.

It can be seen, therefore, that the nearest leaf spring element 76 over which each leaf spring element 76 crosses is free to move axially in the direction enabling the limited axial movement of the armature to be drawn into engagement with the inner body upon energization of the electromagnetic coil 24. At the same time, its opposite end is free to move toward the direction to accommodate the limited movement of the armature since it passes beneath the end of the more remote leaf spring element 76, with the spacer 86 providing the necessary clearance.

Accordingly, it can be seen that the leaf spring elements 76 may be made much longer than if a crossing pattern were not provided as in the patent application referred to above. It can be seen in FIG. 2 that the kidney shaped slots 74 are largely clear of the springs at the same time to thus minimize the interference with the flux path from the inner body into the armature.

Accordingly, the proper spring force is easily achieved since the torque carrying capacity of the coupling arrangement is not compromised by the longer length, whereas the proper flexibility of the springs is provided by the increased length of each of the leaf spring elements 76, so as to insure a sufficiently low axial bias force such that, with increased wear, the armature may still be reliably drawn into engagement with the inner body.

The spacer 86 provides, also, for an initial pre-load of the spring elements to set a pre-load bias force exerted on the armature.

While the coupling arrangement has particular application in the context described of an electromagnetic clutch having axially movable members, it should be understood that the coupling arrangement may be utilized in any context where a rotary coupling is desired between an axially fixed member (hub 24) and an axially moveable member, i.e., armature 68 which is rotatably driven thereby while being allowed limited axial movement against a biased spring force generated by the coupling.

What is claimed is:

1. A coupling arrangement for providing for a first rotatable hub member axially fixed and adapted to be coupled to a second rotary member, said second rotary member mounted for limited relative axial movement relative to said first rotatable member, the coupling arrangement comprising:

a plurality of elongated leaf spring elements extending in a generally circumferential direction about the axis of rotation of said members, each of said leaf spring elements having one end affixed to said rotary member and an opposite end affixed to said rotatable axially fixed member, whereby said leaf spring elements transmit torque therebetween;

said leaf spring elements extending in a crossing pattern with respect to each other, in which each of said leaf spring elements crosses over adjacent leaf spring elements, said crossing pattern comprising the extension of each of said leaf spring elements over the portions adjacent each of the connected ends of the next adjacent two leaf spring elements in said series, each of said leaf spring elements having said one and other ends connected alternately to said second rotary member and said axially fixed first rotatable member about the circumference thereof and wherein each one end of said leaf spring elements connected to said axially movable second rotary member passes to one predetermined side of the next adjacent spring element having its other end connected to said first rotatable member and thence passes along another predetermined side of the more remote leaf spring element having its one end connected to said second rotary axially movable member;

whereby said leaf spring elements are disposed in a crossing pattern without interfering with each other upon relative axial movement of said axially movable member.

2. The coupling arrangement according to claim 1 wherein each of said leaf spring elements is secured to said first rotatable member at a point axially offset from said axially movable member, whereby said portions of each of said leaf spring elements in passing over said portions of said leaf spring element at the point where said leaf spring elements are connected to said first rotatable member, pass through a clearance space provided by said axial offset to preclude contact between said crossed leaf spring elements.

3. The coupling arrangement according to claim 2 wherein six of said leaf spring elements are provided extending circumferentially about said coupling arrangement axis.

4. In an electromagnetically operated clutch of the type consisting of an axially fixed member and an axially movable rotatable member, the improvement comprising:

a coupling arrangement for coupling together said axially fixed member and said axially movable rotatable member to be rotatable together while allowing relative axial movement of said axially movable rotatable member, said coupling arrangement comprising a series of elongated leaf spring elements extending in a generally circumferential direction about the axis of rotation of said members, each of said leaf spring elements being affixed at one end to said axially fixed member and at its opposite end to said axially movable rotatable member, whereby said leaf spring elements transmit torque therebetween;

said leaf spring elements extending in a crossing pattern with respect to each other, in which each of said leaf spring elements overlaps adjacent leaf spring elements, said crossing pattern comprising the extension of each of said elongated leaf spring elements overlapping the portions adjacent but spaced away from each of the connected ends of the next adjacent two elongated leaf spring elements in said series, each of said elongated leaf spring elements having one end and an opposite end, said one end connected to said axially movable rotatable member and said opposite end connected to said axially fixed member about the circumference thereof, said opposite end of each of said leaf spring elements further overlapping the next adjacent spring element having one end connected to said axially movable rotatable member and thence overlapping the more remote leaf spring element having said opposite end connected to said axially fixed member, said leaf spring elements further being disposed in a crossing pattern without interfering with each other upon relative axial movement of said axially movable rotatable member.

5. The electromagnetic clutch arrangement according to claim 4 wherein said coupling arrangement includes each of said leaf spring elements being secured to said axially movable rotatable member at a point axially offset from said axially fixed member, whereby said portions of each of said leaf spring elements in overlapping said portions of said leaf spring element at the point where said elongated leaf spring elements are connected to said axially movable rotatable member, pass through a clearance space provided by said axial offset to preclude contact between said overlapped elongated leaf spring elements.

6. The electromagnetic clutch according to claim 5 wherein six of said leaf spring elements are provided extending circumferentially about said clutch axis.

* * * * *

UNITED STATES PATENT AND TRADEMARK OFFICE
CERTIFICATE OF CORRECTION

PATENT NO. : 4,278,161
DATED : July 14, 1981
INVENTOR(S) : Michael L. Mower & William A. Carleton It is certified that error appears in the above—identified patent and that said Letters Patent is hereby corrected as shown below:

Column 2, line 59, after "extension" insert ----portion----.

Column 4, line 28, delete "shaped slots" and insert ----shaped-slots----.

*Signed and Sealed this*

*Twenty-seventh* Day of *October 1981*

[SEAL]

*Attest:*

*Attesting Officer*

GERALD J. MOSSINGHOFF
*Commissioner of Patents and Trademarks*